United States Patent
Nieves et al.

(10) Patent No.: US 9,934,021 B2
(45) Date of Patent: Apr. 3, 2018

(54) SYSTEM AND METHOD FOR ADAPTIVE APPLICATION SELF-UPDATING

(71) Applicant: Dell Products, LP, Round Rock, TX (US)

(72) Inventors: Alberto Nieves, Austin, TX (US); Daniel L. Hamlin, Round Rock, TX (US); Jeffrey S. Myers, Salado, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 8 days.

(21) Appl. No.: 14/644,600

(22) Filed: Mar. 11, 2015

(65) Prior Publication Data

US 2016/0266888 A1    Sep. 15, 2016

(51) Int. Cl.
G06F 9/44    (2006.01)
G06F 9/445    (2018.01)

(52) U.S. Cl.
CPC ................................. G06F 8/65 (2013.01)

(58) Field of Classification Search
CPC ......... G06F 8/61; G06F 8/65; G06F 17/30899
USPC ....................................................... 717/173
See application file for complete search history.

(56) References Cited

U.S. PATENT DOCUMENTS

| | | | |
|---|---|---|---|
| 7,206,828 B1 * | 4/2007 | Bourke-Dunphy | G06F 9/44505 709/221 |
| 7,512,635 B1 * | 3/2009 | Solin | G06F 8/65 |
| 7,555,551 B1 | 6/2009 | McCorkendale et al. | |
| 7,574,481 B2 | 8/2009 | Moore et al. | |
| 8,230,415 B1 * | 7/2012 | Thomas | G06F 21/57 717/168 |
| 8,701,102 B2 | 4/2014 | Appiah et al. | |
| 9,262,146 B1 * | 2/2016 | Gupta | G06F 17/30899 |
| 2004/0187103 A1 * | 9/2004 | Wickham | G06F 8/65 717/168 |
| 2005/0132179 A1 * | 6/2005 | Glaum | G06F 11/1433 713/1 |
| 2008/0154805 A1 * | 6/2008 | Gurumoorthy | G06F 9/505 706/12 |
| 2009/0100422 A1 * | 4/2009 | Abe | G06F 9/4411 717/174 |
| 2009/0222483 A1 * | 9/2009 | Johnson | G06Q 10/10 |
| 2010/0199271 A1 * | 8/2010 | Harada | G06F 8/61 717/168 |
| 2013/0227641 A1 * | 8/2013 | White | H04L 63/20 726/1 |

* cited by examiner

*Primary Examiner* — Duy Khuong T Nguyen
(74) *Attorney, Agent, or Firm* — Larson Newman, LLP

(57) ABSTRACT

An information handling system, includes a processor to execute an application and an update system to determine to provide an update to the application. The update system includes an identity context engine to determine an identity context for the information handling system and a system context engine to determine a system context for the information handling system. The update system determines whether to retrieve an update manifest for the update based upon the identity context, the system context, and a manifest policy, determines whether to download the update based upon the identity context, the system context, and a download policy, and determines whether to install update based upon the identity context, the system context, and an installation policy.

18 Claims, 3 Drawing Sheets

SYSTEM AND METHOD FOR ADAPTIVE APPLICATION SELF-UPDATING

FIELD OF THE DISCLOSURE

This disclosure generally relates to information handling systems, and more particularly relates to a system and method for adaptive application self-updating in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
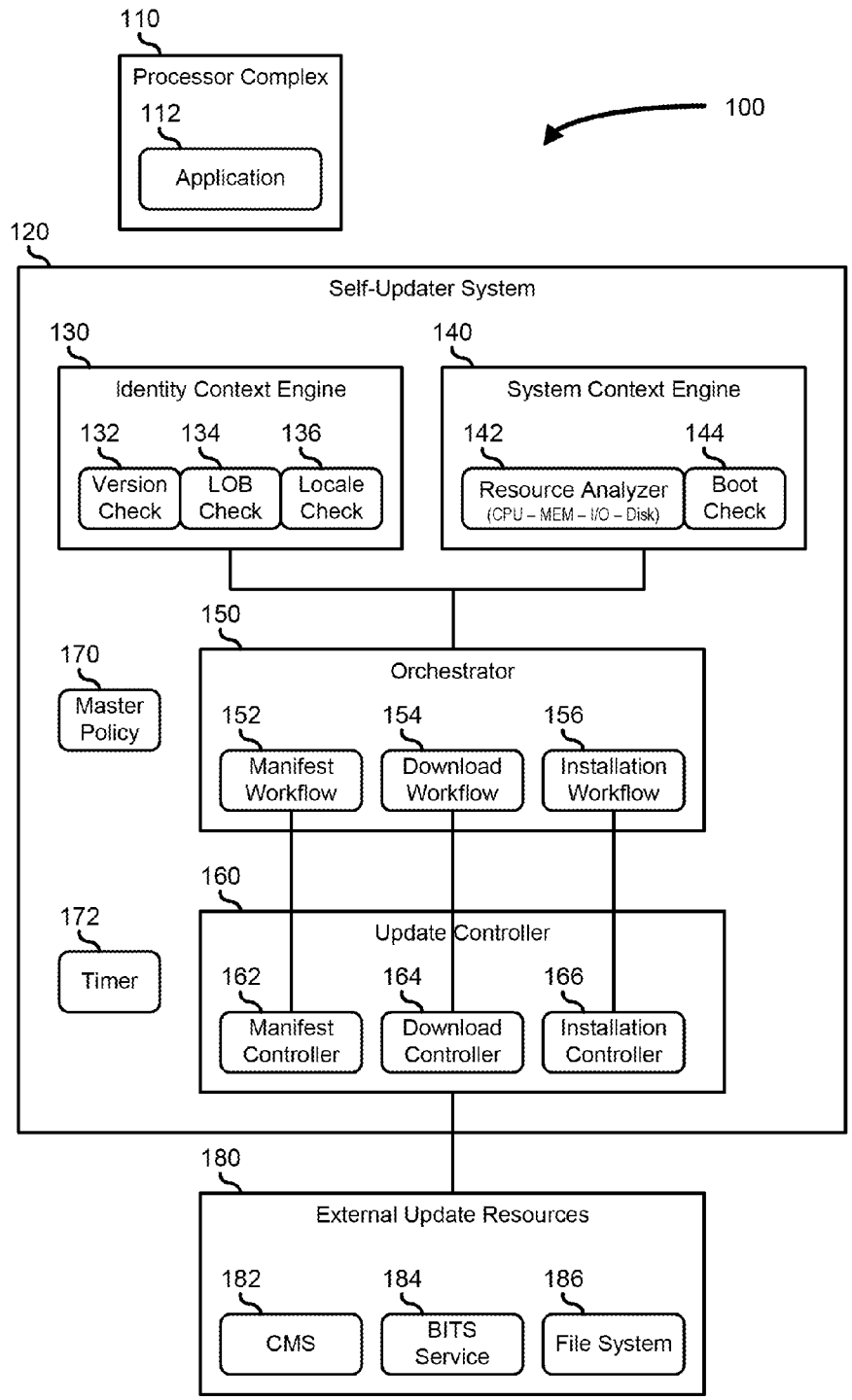
FIG. 1 is a block diagram illustrating an information handling system according to an embodiment of the present disclosure.

FIG. 1 illustrates an embodiment of an information handling system 100. For purpose of this disclosure information handling system 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes a processor complex 110 and a self-updater system 120. External update resources 180 are illustrated as being connected to information handling system 100. Processor complex 110 represents a processing system that performs the computational functions of information handling system 100, and can include one or more CPUs, chipset input/output (I/O) components, volatile and non-volatile memory components, and other components, as needed or desired. Processor complex 110 includes an application 112. Application 112 broadly represents code and data that is executable on processor complex 110 to implement the computational functions of information handling system 100, or content that is presentable on the information handling system. Application 112 is stored on one or more memory component or storage medium of information handling system 100. For example, application 102 can include Basic Input/Output System (BIOS) code, Universal Extensible Firmware Interface (UEFI) code, firmware or driver code associated with the hardware or functions of information handling system 100, operating system (OS) code, executable program code, data associated with the code, or any other code or data that resides in a storage medium of the information handling system. In particular, application 112 is characterized by the fact that the application can be updated, such as by replacing the code or data residing in the memory components or storage media of information handling system 100 with updated code, data, or content. For example, particular code can be replaced with a newer revision of the code, data can be replaced with newer or different data, or content can be replaced with different or updated content.

Self-updater system 120 includes an identity context engine 130, a system context engine 140, an orchestrator 150, an update controller 160, a master update policy 170, and a timer 172. Identity context engine 130 includes a version check module 132, a line-of-business (LOB) check module 134, and a locale check module 136. System context engine 140 includes a resource analyzer module 142 and a boot check module 144. Orchestrator 150 includes an update workflow module 152, a download workflow module 154, and an installation workflow module 156. Update controller 160 includes a manifest controller module 162, a download controller module 164, and an installation controller module 166.

External update resources 180 include a Content Management System (CMS) service 182, a Background Intelligent Transfer Service (BITS) service 184, and a file system 186. External update resources 180 operate as various repositories for storing the various updates to application 112. As such, external update resources 180 operate to provide information handling system 100 with manifest information related to the various updates. An example of manifest information for a particular update includes metadata that provides version information for the update, version information for application 112 that indicates the version or versions of the application that are the target of the update, a date limit for the update that indicates an install-by date for the update, licensing information for the update, LOB information for the update, the size of the update, a bandwidth limit on the speed of the update, other information related to the update, or a combination thereof. The operations of external update resources 180, and particularly of CMS service 182, BITS service 184, and of file system 186 are known in the art and further discussion will not be discussed further herein.

In a particular embodiment, information handling system 100 operates to determine different contexts within the information handling system, and, based upon the contexts and master policy 170, to determine when to check external update resources 180 for update manifests, when to download the applicable updates, and when to install the downloaded updates. The different contexts with information handling system 100 are determined by identity context engine 130 and by system context engine 140. The identity context of information handling system 100 is determined by identity context engine 130. In particular, version check module 132 operates to determine the current version of application 112, and, in response to receiving an update manifest, to determine it updating the application is suitable based upon the version of the application and the version information in the update manifest. LOB check module 134 operates to determine the LOB context for information handling system 100. For example, information handling system 100 may have different update requirements based upon whether the information handling system is a personal computer, where it may be more desirable to prioritize user interface type updates, or an enterprise computer, where it may be more desirable to prioritize security type updates. In response to receiving an update manifest, LOB check module 134 operates to determine if updating the application is suitable based upon the LOB of the information handling system and the LOB information in the update manifest. Locale check module 136 operates to determine a locale context for the information handling system. For example, locale can refer to a physical location, or to a type of system that is represented by information handling system 100. As such, when a laptop computer is located in a home office building or within a secure firewall, security updates may be a lower priority than data updates, while the same laptop being connected to an unsecure WiFi may call for a higher priority for the security updates. In each case described above, master policy 170 can include policy limits and settings that determine when an update manifest is acquired, when to download the update, and when to install the update based upon the identity context. In a particular embodiment, identity context can include time check information, user check information, or other identity context checking information, as needed or desired.

The system context of information handling system 100 is determined by system context engine 140. In particular, resource analyzer module 142 operates to the operational status of the elements of processor complex 110. For example, resource analyzer module 142 can determine usages for a CPU of processor complex 110, memory and disk utilization, I/O utilization, video processor utilization, other component utilization, or a combination thereof. Boot check module 144 operates to determine whether or not information handling system 100 is operating in a boot context. In particular, where information handling system 100 is being booted by a user for a first time, the out-of-box-experience (OOBE) may be determined to be an opportune time to perform a multitude of updates, because the user is already expecting a certain delay in using the information handling system because of other user experience setup options are being performed anyway. Also, such updates can likely be performed in the background while the user sets up the options. Further, after the user's first boot, other boot contexts can be considered as an opportune time to perform retrieve update manifests or to download the updates. This may be because the CPU is being heavily utilized during the boot process, while network I/O may be available to retrieve update manifests or to download the updates.

Orchestrator 150 operates to coordinate the scheduling and execution of the update manifest retrieval, the update download, and the update installation. In particular, manifest workflow module 152 operates to determine, according to master policy 170, whether or not the identity context and the system context indicates that an update manifest should be retrieved, and directs manifest controller module 162 to retrieve update manifests when the decision is made to retrieve the update manifest. Download workflow module 154 operates to determine, according to master policy 170, whether or not the identity context and the system context indicates that an update should be downloaded, and directs download controller module 164 to download the updates when the decision is made to download the updates. Installation workflow module 156 operates to determine, according to master policy 170, whether or not the identity context and the system context indicates that an update should be installed, and directs installation controller module 164 to install updates when the decision is made to install the updates.

Update controller 160 operates at the direction of orchestrator 150 to perform the steps in the update process: retrieving the update manifest, downloading the update, and installing the update. In particular, manifest controller module 162 operates to query external update resources 180 to determine if an update is available for application 112, and if so, to retrieve the update manifest and provide the update manifest to orchestrator 150 to evaluate when to download and install the update. Download controller module 164 operates to download the update from external update resources 180. Installation controller module 166 operates to install the update on information handling system 100. Manifest, download, and installation controllers are known in the art and further discussion will not be discussed further herein.

Timer 172 operates to set a manifest workflow timer, a download workload timer, an installation workload timer, and a boot timer. The manifest workflow timer operates when manifest workflow module 152 makes a decision to not retrieve the update manifest. Here, the manifest workflow timer is set to trigger a reevaluation by manifest workflow module 152 as to whether or not the identity context and the system context indicates that an update manifest should be retrieved. The download workload timer operates when download workflow module 154 determines to not download an update. Here, the download workload timer is set to trigger a reevaluation by download workload module 154 to determine whether or not the identity context and the system context indicates that an update should be downloaded. The installation workload timer operates when installation workflow module 156 determines to not install an update. Here, the installation workload timer is set to trigger a reevaluation by installation workload module 156 to determine whether or not the identity context and the system context indicates that an update should be installed.

Figure 2:
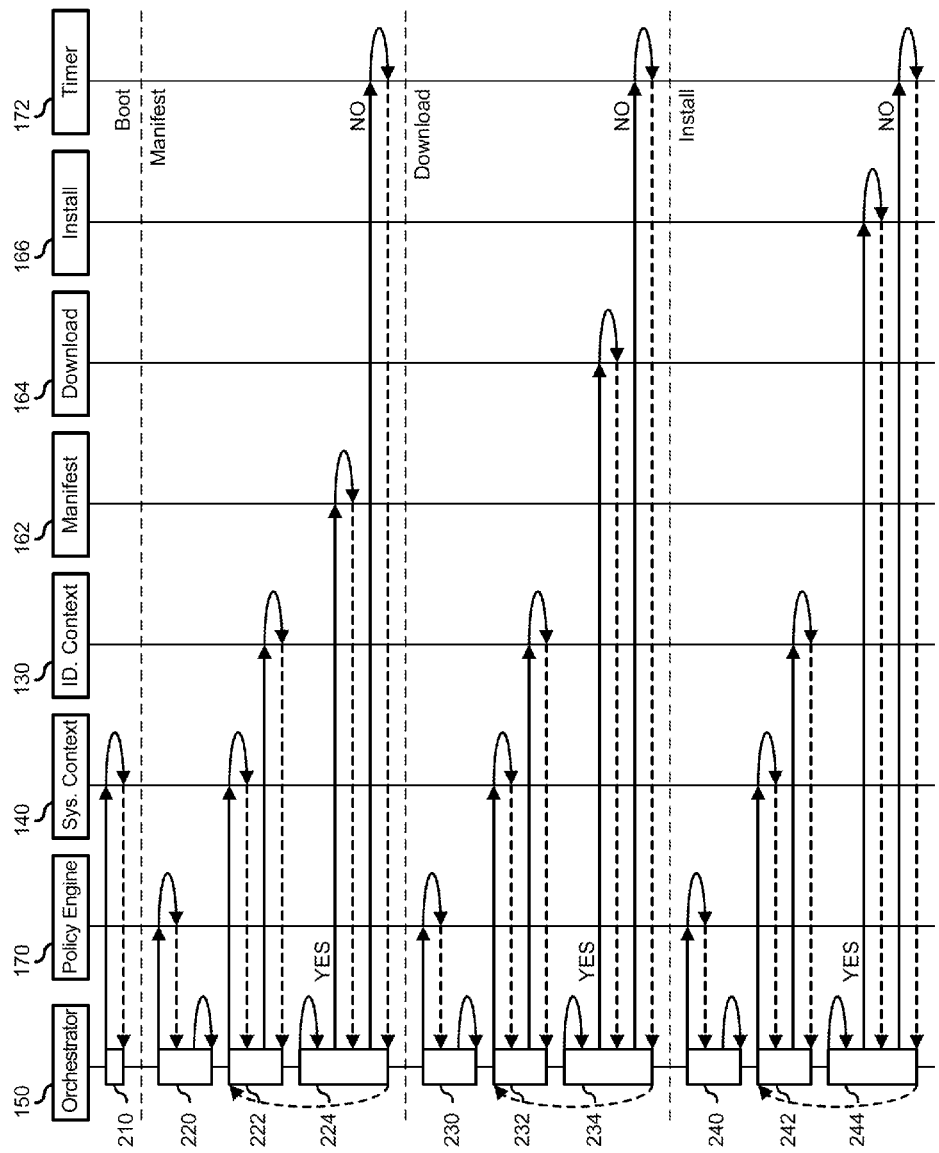
FIG. 2 and is a flowchart illustrating a method for adaptive application self-updating in the information handling system of FIG. 1 according to an embodiment of the present disclosure.

FIG. 2 illustrates a method for adaptive application self-updating in information handling system 100, showing the operations of orchestrator 150, policy engine 170, system context engine 140, identity context engine 130, manifest control module 162, download controller module 164, installation controller module 166, and timer 172. During a boot operation of information handling system 100, a boot workflow 210 is performed where orchestrator 150 queries system context engine 140 for context information related to resource utilization and boot context checking. Here, system context engine 140 provides an indication as to whether or not the boot is a user's first boot of information handling system or another boot, in order to determine whether or not to apply OOBE policies to the subsequent update workflows as described below. In a particular embodiment, boot workflow 210 allows for the updating of the policy information in policy engine 170.

During a manifest operation of information handling system 100, a policy workflow 220 is performed where orchestrator 150 queries policy engine 170 for the manifest policy information and determines the manifest policy for application 112 based on the manifest policy information. Next a context check workflow 222 is performed where orchestrator 150 queries system context engine 140 and identity context engine 130 to determine the present context of information handling system 100 as it relates to update manifest operations. Next, a manifest workflow 224 is performed where a decision is made as to whether or not, based upon the manifest policy information and the present context, an update manifest should be retrieved. If so, orchestrator 150 directs manifest controller module 162 to retrieve the update manifest. If not, orchestrator 150 sets the manifest workflow timer in timer 172 to trigger a repeat of context check workflow 222 to reevaluate whether or not the identity context and the system context indicates that the update manifest should be retrieved.

During a download operation of information handling system 100, a policy workflow 230 is performed where orchestrator 150 queries policy engine 170 for the download policy information and determines the download policy for the update based on the download policy information. Next a context check workflow 232 is performed where orchestrator 150 queries system context engine 140 and identity context engine 130 to determine the present context of information handling system 100 as it relates to update download operations. Next, a download workflow 234 is performed where a decision is made as to whether or not, based upon the download policy information and the present context, an update should be downloaded. If so, orchestrator 150 directs download controller module 164 to download the update. If not, orchestrator 150 sets the download workflow timer in timer 172 timer to trigger a repeat of context check workflow 232 to reevaluate whether or not the identity context and the system context indicates that the update manifest should be downloaded.

During an install operation of information handling system 100, a policy workflow 240 is performed where orchestrator 150 queries policy engine 170 for the installation policy information and determines the installation policy for the update based on the installation policy information. Next a context check workflow 242 is performed where orchestrator 150 queries system context engine 140 and identity context engine 130 to determine the present context of information handling system 100 as it relates to update installation operations. Next, an installation workflow 244 is performed where a decision is made as to whether or not, based upon the installation policy information and the present context, an update should be installed. If so, orchestrator 150 directs installation controller module 166 to install the update. If not, orchestrator 150 sets the installation workflow timer in timer 172 timer to trigger a repeat of context check workflow 242 to reevaluate whether or not the identity context and the system context indicates that the update manifest should be installed.

Figure 3:
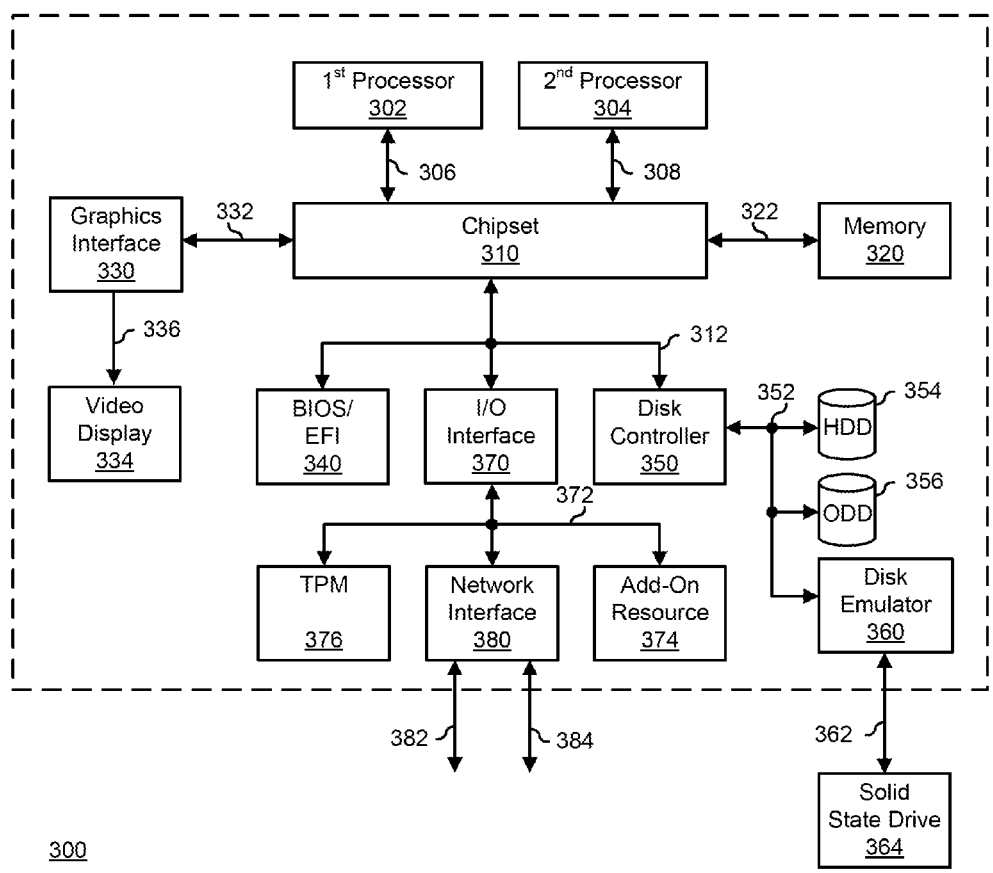
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor to execute an application;
an update controller; and
an update system to determine to provide an update to the application, the update system comprising:
an identity context engine to determine an identity context for the information handling system, wherein the identity context is based upon a line of business associated with the information handling system, the line of business identifying the information handling system as one of a personal computer or an enterprise computer, and wherein the identity context is further based upon a physical location of the information handling system;
a system context engine to determine a system hardware and software context for the information handling system; and
a boot-checker to determine a boot context for the information handling system;
wherein the update system:
determines whether to retrieve an update manifest for the update based upon the identity context, the system hardware and software context, the boot context, and a manifest policy;

determines whether to download the update based upon the identity context, the system hardware and software context, the boot context, and a download policy;

determines whether to install update based upon the identity context, the system hardware and software context, the boot context, and an installation policy; and determines to install the update, the update system further directs the update controller to install the update.

2. The information handling system of claim 1, wherein when the update system determines to retrieve the update manifest, the update system further directs the update controller to retrieve the update manifest.

3. The information handling system of claim 2, wherein when the update system determines to download the update, the update system further directs the update controller to download the update.

4. The information handling system of claim 1, wherein:
the manifest policy includes a network bandwidth limit; and
in determining to retrieve the update manifest, the update system further determines that the system hardware and software context includes a network bandwidth utilization level that is lower than the network bandwidth limit.

5. The information handling system of claim 1, wherein:
the manifest policy includes a storage utilization limit; and
in determining to retrieve the update manifest, the update system further determines that the system hardware and software context includes a storage utilization level that is lower than the storage utilization limit, and that a size of the update is within the storage utilization limit.

6. The information handling system of claim 1, wherein:
the download policy includes a line-of-business policy; and
in determining to download the update manifest, the update system further determines that the identity context includes line-of-business information that corresponds to the line-of-business policy.

7. The information handling system of claim 1, wherein the boot context includes an indication that the information handling system is in a boot operation.

8. The information handling system of claim 1, further comprising:
a timer;
wherein when the update system determines to not retrieve the update manifest, the update system sets the timer to trigger a first reevaluation by the update system to determine whether to retrieve the update manifest.

9. The information handling system of claim 8, wherein when the update system determines to not download the update, the update system sets the timer to trigger a second reevaluation by the update system to determine whether to download the update.

10. The information handling system of claim 8, wherein when the update system determines to not install the update, the update system sets the timer to trigger a third reevaluation by the update system to determine whether to install the update.

11. A method for determining whether to update an application, the method comprising:
determining, by an identity context engine of an information handling system, an identity context for the information handling system, wherein the identity context is based upon a line of business associated with the information handling system, the line of business identifying the information handling system as one of a personal computer or an enterprise computer, and a physical location of the information handling system;

determining, by a system context engine, a system hardware and software context for the information handling system;

determining, by a boot-checker, a boot context for the information handling system;

determining, by an update system, whether to retrieve an update manifest for the update based upon the identity context, the system hardware and software context, the boot context, and a manifest policy;

determining whether to download the update based upon the identity context, the system hardware and software context, the boot context, and a download policy;

determining whether to install update based upon the identity context, the system hardware and software context, the boot context, and an installation policy; and directing an update controller of the information handling system to install the update in response to determining to install the update.

12. The method of claim 11, further comprising: directing the update controller of the information handling system to retrieve the update manifest in response to determining to retrieve the update manifest.

13. The method of claim 12, further comprising:
directing the update controller to download the update in response to determining to download the update.

14. The method of claim 11, wherein:
the manifest policy includes a network bandwidth limit; and
in determining to retrieve the update manifest, the method further comprises determining that the system hardware and software context includes a network bandwidth utilization level that is lower than the network bandwidth limit.

15. The method of claim 11, wherein:
the manifest policy includes a storage utilization limit; and
in determining to retrieve the update manifest, the method further comprises determining that the system hardware and software context includes a storage utilization level that is lower than the storage utilization limit, and that a size of the update is within the storage utilization limit.

16. The method of claim 11, wherein:
the download policy includes a line-of-business policy; and
in determining to download the update manifest, the method further comprises determining that the identity context includes line-of-business information that corresponds to the line-of-business policy.

17. The method of claim 11, wherein the boot context includes an indication that the information handling system is in a boot operation.

18. A non-transitory computer-readable medium including code for performing a method for determining to update an application, the method comprising:
determining an identity context for an information handling system, wherein the identity context is based upon a line of business associated with the information handling system, the line of business identifying the information handling system as one of a personal computer or an enterprise computer, and a physical location of the information handling system;

determining a system hardware and software context for the information handling system; determining, by a boot-checker, a boot context for the information handling system; determining whether to retrieve an update manifest for the update based upon the identity context, the system hardware and software context, the boot context, and a manifest policy;

determining whether to download the update based upon the identity context, the system hardware and software context, the boot context, and a download policy;

determining whether to install update based upon the identity context, the system hardware and software context, the boot context, and an installation policy; and directing an update controller of the information handling system to install the update in response to determining to install the update.

* * * * *